(12) United States Patent
Karahasanovic et al.

(10) Patent No.: US 11,894,611 B2
(45) Date of Patent: Feb. 6, 2024

(54) AUTOMOTIVE MICROWAVE LENS DEVICE FOR GENERATION OF HEART-SHAPED RADIATION PATTERN IN INTERIOR CAR SENSING APPLICATIONS

(71) Applicant: IEE INTERNATIONAL ELECTRONICS & ENGINEERING S.A., Echternach (LU)

(72) Inventors: Una Karahasanovic, Trier (DE);
Andreas Fox, Freudenburg (DE);
Claude Watgen, Moutfort (LU);
Franck Lemoine, Launstroff (FR);
Thomas Stifter, Trier (DE); Dimitri Tatarinov, Trier (DE)

(73) Assignee: IEE INTERNATIONAL ELECTRONICS & ENGINEERING S.A., Echternach (LU)

(*) Notice: Subject to any disclaimer, the term of this patent is extended or adjusted under 35 U.S.C. 154(b) by 368 days.

(21) Appl. No.: 17/311,336

(22) PCT Filed: Dec. 5, 2019

(86) PCT No.: PCT/EP2019/083840
§ 371 (c)(1),
(2) Date: Jun. 6, 2021

(87) PCT Pub. No.: WO2020/115220
PCT Pub. Date: Jun. 11, 2020

(65) Prior Publication Data
US 2022/0021124 A1    Jan. 20, 2022

(30) Foreign Application Priority Data

Dec. 6, 2018 (LU) .................................. LU101027
Feb. 5, 2019 (LU) .................................. LU101115

(51) Int. Cl.
*H01Q 15/08* (2006.01)
*H01Q 19/06* (2006.01)
(Continued)

(52) U.S. Cl.
CPC .......... *H01Q 15/08* (2013.01); *G01S 13/931* (2013.01); *H01Q 1/3233* (2013.01); *H01Q 19/062* (2013.01)

(58) Field of Classification Search
CPC .... H01Q 15/08; H01Q 1/3233; H01Q 19/062; G01S 13/931
See application file for complete search history.

(56) References Cited

U.S. PATENT DOCUMENTS 5,680,139 A * 10/1997 Huguenin ............... G01S 7/032
                                                                343/753
6,157,499 A    12/2000 Schmidt et al.
(Continued)

FOREIGN PATENT DOCUMENTS

DE    102017212722 A1 *  1/2019
EP    1750329 A1           2/2007
(Continued)

OTHER PUBLICATIONS

Radome for a vehicle radar system and method of manufacturing a radome. Berrisch Guenter and Crochemore Laurent. (Year: 2007).*
(Continued)

*Primary Examiner* — Vibol Tan
(74) *Attorney, Agent, or Firm* — Reising Ethington P.C.

(57) ABSTRACT

A dielectric lens device for shaping a radar beam includes a first and a second plano-convex cylindrical dielectric lens member and a plane-parallel dielectric substrate. The two plano-convex cylindrical dielectric lens members are arranged with their plane surfaces towards a same surface of the plane-parallel dielectric substrate. The plano-convex
(Continued)

cylindrical dielectric lens members are interconnected to the plane-parallel dielectric substrate in a material fit.

11 Claims, 3 Drawing Sheets

(51) Int. Cl.
  *G01S 13/931* (2020.01)
  *H01Q 1/32* (2006.01)

(56) References Cited

U.S. PATENT DOCUMENTS

| | | | |
|---|---|---|---|
| 7,036,390 B2 | 5/2006 | Tsuchihashi et al. | |
| 7,403,166 B2* | 7/2008 | Clymer | H01Q 21/08 343/762 |
| 7,983,817 B2* | 7/2011 | Breed | B60R 21/01536 367/137 |
| 10,644,408 B2* | 5/2020 | Sakai | H01Q 15/08 |
| 2018/0170213 A1 | 6/2018 | Lu-Dac et al. | |
| 2019/0067827 A1 | 2/2019 | Sakai et al. | |
| 2020/0050874 A1 | 2/2020 | Lorenz et al. | |

FOREIGN PATENT DOCUMENTS

| | | | |
|---|---|---|---|
| JP | 2017150894 A | 8/2017 | |
| WO | 2015140333 A1 | 9/2015 | |
| WO | WO-2017146163 A1 * | 8/2017 | ........... G01S 13/931 |
| WO | 2018054823 A1 | 3/2018 | |

OTHER PUBLICATIONS

Radar sensor with several main beam directions—Mayer, Marcel & Baur, Klaus; DE 102017212722 A1 Published on Jan. 31, 2019 (Year: 2019).*

International Search Report corresponding to International Application No. PCT/EP2019/083840, dated Feb. 4, 2020, 3 pages.

Written Opinion corresponding to International Application No. PCT/EP2019/083840, dated Feb. 4, 2020, 8 pages.

T. Zhang et al., "Non-Contact Estimation at 60 GHz for Human Vital Signs Monitoring Using a Robust Optimization Algorithm", IEEE International Symposium on Antennas and Propagation (APSURSI), Fajardo, 2016, pp. 1165-1166.

B. Barès et al., "Design and optimisation of axisymmetric millimetre-wave shaped lens antennas with directive, secant-squared and conical beams", IET Microwaves, Antennas & Propagation, vol. 1, No. 2, Apr. 2007, pp. 433-439.

C. A. Fernandes et al., "Dielectric Lens Antennas", Handbook of Antenna Technologies, Sep. 2016, pp. 1001-1064.

* cited by examiner

AUTOMOTIVE MICROWAVE LENS DEVICE FOR GENERATION OF HEART-SHAPED RADIATION PATTERN IN INTERIOR CAR SENSING APPLICATIONS

TECHNICAL FIELD

The invention relates to a dielectric lens device for shaping a radar beam, for use in particular in interior automotive radar sensing applications, and a radar device for interior automotive radar sensing applications.

BACKGROUND

In the technical field of passenger transportation, and in particular in automotive technology, it is known to employ vehicle interior occupant sensing technologies, for instance for detection of left-behind pets and/or children, vital sign monitoring, vehicle seat occupancy detection in support of a seat belt reminder (SBR) system and/or activation control for an auxiliary restraint system (ARS) system, or for anti-theft alarm. Further, valuable information that is usable as an important input for Advanced Driver Assistance Systems (ADAS) could be provided by monitoring a vital sign of a detected person.

For instance, it has been proposed in the art to use electromagnetic waves in the optical regime for the purpose of vehicle seat occupancy detection.

U.S. Pat. No. 7,983,817 B2 describes an arrangement and a method for obtaining information about a vehicle occupant in a compartment of the vehicle, in which a light source is mounted in the vehicle. Structured light, for instance formed by a pattern of infrared beams or formed by polarizing the rays of light from the light source, is projected into an area of interest in the compartment. The structured light originating from the light source and being reflected is detected at an image sensor at a position different than the position from which the structured light is projected. The reflected light is analyzed relative to the projected structured light to obtain information about the area of interest.

It has also been proposed in the art to use radar technology for vehicle interior occupant sensing, for instance for seat occupant detection systems. Occupancy sensors based on radar technology offer advantages in comparison to other occupancy detection methods as their operation is contact-free and can be unnoticeable for vehicle occupants. Moreover, radar sensors can easily be integrated in the vehicle interior, for example behind plastic covers and textiles.

In U.S. Pat. No. 7,036,390 B2, a method for detecting a human body in a vehicle is described. A synthetic wave is obtained, which represents the synthesis (i.e. the superposition) of a transmitted wave radiated from a sensor and a reflected wave returned from a breathing human body, and the presence or absence of a human in the vehicle is detected from the envelope of the synthetic wave. When the presence of a human is detected continuously for a predetermined length of time, it is determined that a human is present in the vehicle.

From the article by T. Zhang et al., "*Non-Contact Estimation at 60 GHz for Human Vital Signs Monitoring Using a Robust Optimization Algorithm*", 2016 IEEE International Symposium on Antennas and Propagation (APSURSI), Fajardo, 2016, pp. 1165-1166 (doi: 10.1109/APS.2016.7696290), an approach to estimate body movements related to vital activities by means of a 60 GHz Doppler radar is known, using robust optimization algorithms to extract heart-rate and breathing information from the radar signals. The article shall hereby be incorporated by reference in its entirety with effect for those jurisdictions permitting incorporation by reference.

WO 2015/140333 A1 describes a method and system for ascertaining whether an unattended child is present within an automotive vehicle. The method uses a radar sensor system comprising a transmitter, and at least one sensor and processing circuitry. The method comprises: illuminating at least one occupiable position within the vehicle with radiation, the radiation exhibiting multiple frequencies; generating radar sensor signals from radiation reflected as a result of the transmitted radiation, a plurality of the radar sensor signals corresponding to different frequencies; operating the processing circuitry for generating, based on the radar sensor signals, a first indicator value, the first indicator value indicating a degree of motion associated with the occupiable position; determining whether the first indicator value satisfies a first predetermined criteria; if the first indicator value satisfies the first predetermined criteria, generating, based on radar sensor signals, a second indicator value, the second indicator value indicating a degree of repetitive pattern within the radar sensor signals; and determining that an unattended child is present within the automotive vehicle if the second indicator value satisfies a second predetermined criteria.

In an arrangement for observing an interior of a vehicle, in which a radar frequency sensor is integrated symmetrically in a vehicle ceiling in order to observe a rear bench of the vehicle, and in which the main lobe antenna pattern is Gaussian-like (i.e. decreasing monotonically from the direction of maximum gain), a person sitting in the middle of the rear bench would receive more radar power than a person sitting at the left or at the right position, as the person in the middle is positioned at a smaller distance to the radar sensor. The received power depends on the exact shape of the antenna member radiation pattern and is inversely proportional to the 4th power of the distance between a target or object and the radar sensor, so that even small differences in distance have a large effect on a level of received radar power. Ideally, a radar power received in the middle position should be the same as a radar power received at the left/right position such that the radar sensor performance is independent of the passenger position on the rear bench.

SUMMARY

It is therefore an object of the invention to provide a radar device for generating a radar radiation pattern that balances a radar power that is transmitted to a middle position and to outer positions with regard to the radar device, such as exist at a vehicle rear bench.

One possible solution could be to design a radar antenna for generating a radiation pattern that balances the radar power transmitted to the middle position of the rear bench and the outer, further away positions of the rear bench. This solution has the drawback of being time consuming and costly, as it has to be done for each potential specific application.

However, it is also known in the art to use dielectric lenses for shaping beams of radar antennas.

Shaped millimeter-wave lens antennas are described, for instance, in B. Barès and R. Sauleau, "*Design and optimisation of axisymmetric millimetre-wave shaped lens antennas with directive, secant-squared and conical beams*", IET Microwaves, Antennas & Propagation, vol. 1, no. 2, pp. 433-439, April 2007 (doi: 10.1049/iet-map:20060050). The lens antennas are described to be laid out by a design method of optimizing rotationally-symmetric shaped dielectric substrate lenses at millimeter-wave frequencies for determining a best lens profile complying with an arbitrary desired far-field power template. Firstly, a starting lens shape is determined by using an analytical geometrical optics (GO) synthesis method. Then, the radiation characteristics of the lens is computed using a hybrid GO-PO (physical optics) technique accounting for diffraction effects, followed by an iterative optimization of trial lens profiles using a local minimization procedure based on a multidimensional conjugate gradient method (M-CGM).

Also, in the article by C. A. Fernandes et al., "*Dielectric Lens Antennas*", Handbook of Antenna Technologies, September 2016, pp. 1001-1064 (DOI: 10.1007/978-981-4560-44-3_40), Geometrical Optics (GO) is described as a convenient formulation for dielectric lens design for millimeter- and sub-millimeter wave applications. Under certain conditions, it can provide a lens shape that satisfies design requirements after elementary numerical evaluation of closed form analytical expressions, without the need for any trial and error iterations. For generic 3D structures, using GO is numerically involved and may require mathematical tools such as perturbation methods. As another lens design method, the article cites iterative lens synthesis methods, by which the shape is described by some analytical and numerical representation with unknown coefficients. These are determined inside an iterative optimization cycle. Each generated lens is tested using an appropriate lens analysis method until target specifications are met by trial and error.

The method of GO is, however, only applicable in the limit of the wavelength of radiation being much smaller than typical dielectric lens dimensions, and diffraction effects are negligible. This is, for instance, not the case for many millimeter wave automotive applications, where typical lens dimensions are in a similar size range as a radar carrier wavelength.

A software tool (ILASH) is known in the art for the design, analysis and optimization of shaped circular symmetric integrated lens antennas (ILA) for millimeter or sub-millimeter wave applications. The ILASH tool emphasis is on high permittivity double-shell lens configurations, although it can handle single-material lenses as well.

One described path for the design of a shaped lens provides a fast first guess of the lens, based on closed-form analytical lenses expressions derived from Geometrical Optics (GO) formulation. A second path combines lens analysis tools with an optimization algorithm that can successively generate and evaluate meaningful populations of test lenses and iterate the procedure to maximize a given figure of merit. This iterative process can receive a starting lens from the previous path.

The present invention is directed to dielectric lenses for shaping a beam of a radar antenna. It is noted, however, that the proposed dielectric lens design cannot be readily derived from the methods described above.

In one aspect of the present invention, the object may be achieved by a dielectric lens device for shaping a radar beam, used in particular in interior automotive radar sensing applications. The dielectric lens device comprises a first plano-convex cylindrical dielectric lens member and a second plano-convex cylindrical dielectric lens member, and a plane-parallel dielectric substrate.

The term "cylindrical lens member", as used in this application, shall particularly be understood as a lens member whose curved surface comprises at least a section of a cylinder surface. The term "cylinder", as used in this application, shall particularly be understood as a surface consisting of all points on all potential lines which are parallel to a given line and which pass through a fixed plane curve lying in a plane that is substantially arranged perpendicular to the given line. The term "cylinder" shall also encompass surfaces in which the given line is curved. Mathematically, such cylinders shall be considered as a configuration of a plurality of cylinders placed in succession and coaxially, wherein the given line for these cylinders is a straight line, in the limit of a length of the given lines approaching zero length for each cylinder. The curved line may be a curved line lying in a plane, or it may be a curved line in the three-dimensional space. For cylindrical lens members with a curved given line, the term "plano-convex lens member", as used in this application, shall particularly be understood as a lens member that is limited by a convex surface and an oppositely arranged developable surface; i.e. a surface whose Gaussian curvature is zero.

The two plano-convex cylindrical dielectric lens members are arranged with their plane surfaces towards a same surface of the plane-parallel dielectric substrate. Further, the plano-convex cylindrical dielectric lens members are interconnected to the plane-parallel dielectric substrate in a material fit.

It is noted herewith that the terms "first", "second", etc. are used in this application for distinction purposes only, and are not meant to indicate or anticipate a sequence or a priority in any way.

In suitable embodiments, the dielectric lens device may be used to modify a beam-width and a shape of a radar radiation pattern produced by one or more radar frequency antennas for interior car sensing such as, without being limited to, passenger detection or passenger vital-sign monitoring. The dielectric lens device can generate a radar radiation pattern (i.e. an angular characteristic of an antenna directivity) having a local minimum level of radar power between two maximum levels of radar power ("heart-shaped pattern"). Such radar radiation pattern can particularly be used for balancing a radar power transmitted to a middle position of a vehicle rear bench and outer positions of the rear bench. In this way, a position-independent radar sensor functionality can be achieved for an original Gaussian-like antenna member radar pattern.

Starting from an antenna with a Gaussian-type main lobe and in a configuration in which a headliner is added, the headliner can produce maxima and minima in the radiation pattern such as oscillations of radar power, which can have a difference in power as high as 8 dB. These radar power variations might not be desirable. A dielectric lens device with suitably designed cylindrical lens members as described above can mitigate or even eliminate such maxima and minima in the radiation pattern.

By varying the lenses geometry parameters and/or material and/or separation between two plano-convex cylindrical dielectric lens members, a power level of the local minimum between the two maxima of the radiation pattern can be adjusted according to requirements which are raised by radar sensor integration details for a particular vehicle line, vehicle dimensions and a particular antenna design.

Depending on the application, the first plano-convex cylindrical dielectric lens member and the second plano-convex cylindrical dielectric lens member may be arranged in parallel to each other; i.e. their respective directions of extension are aligned in parallel, and/or they may be arranged in a mirror-symmetrical manner.

The dielectric lens device is particularly useful for vehicle interior sensing applications. The term "vehicle", as used in the present application, shall particularly be understood to encompass passenger cars, trucks, semi-trailer trucks and buses.

In preferred embodiments of the dielectric lens device, a first height of the first plano-convex cylindrical dielectric lens member and a second height of the second plano-convex cylindrical dielectric lens member, measured in a direction that is perpendicular to the surface of the plane-parallel dielectric substrate, are substantially equal. This is particularly beneficial for an integration of the dielectric lens device in the middle section of a vehicle ceiling, which is a preferred location for vehicle interior sensing applications such as passenger detection and/or vital-sign monitoring. The design can be particularly useful in combined use with a (left-right) symmetric original antenna member radiation pattern.

However, the first height of the first plano-convex cylindrical dielectric lens member and the second height of the second plano-convex cylindrical dielectric lens member may be unequal to compensate for an offset position of the dielectric lens device at a vehicle ceiling, or when the dielectric lens device is used in combination with a slightly asymmetric (left-right asymmetry) original antenna member radiation pattern.

Preferably, the first and the second plano-convex cylindrical dielectric lens member are arranged in a spaced manner. By adjusting a spacing (or distance) between two plano-convex cylindrical dielectric lens members, a desired level of the local minimum between and with regard to the two maxima of the radiation pattern can be accomplished.

In preferred embodiments of the dielectric lens device, at least one out of the convex surface of the first plano-convex cylindrical dielectric lens member and the convex surface of the second plano-convex cylindrical dielectric lens member is shaped as a portion of an elliptical cylinder surface, i.e. the fixed plane curve is a portion of an ellipse. As a special case, the elliptical cylinder surface may be formed as a circular cylinder surface. In this way, a dielectric lens device can be provided as a solution with a relative low degree of design complexity for balancing a radar power simultaneously transmitted to a middle position and to outer positions with regard to a radar device, such as exist at a vehicle rear bench.

In preferred embodiments of the dielectric lens device, at least one out of the convex surface of the first plano-convex cylindrical dielectric lens member and the convex surface of the second plano-convex cylindrical dielectric lens member is shaped as a portion of a parabolic cylinder surface, i.e. the fixed plane curve is a portion of a parabola. By that, another solution of low design complexity can be provided for balancing a radar power simultaneously transmitted to a middle position and outer positions with regard to a radar device.

In preferred embodiments of the dielectric lens device, an intersection line of at least one out of the convex surface of the first plano-convex cylindrical dielectric lens member and the convex surface of the second plano-convex cylindrical dielectric lens member with a section plane arranged perpendicular to a direction of extension, is shaped as a portion of a hyperbola. By that, yet another solution of low design complexity can be provided for balancing a radar power simultaneously transmitted to a middle position and outer positions with regard to a radar device.

In preferred embodiments of the dielectric lens device, at least one out of the convex surface of the first plano-convex cylindrical dielectric lens member and the convex surface of the second plano-convex cylindrical dielectric lens member is shaped as a portion of a cylinder having a direction of extension that is curved. This means that the spacing (or distance) between two plano-convex cylindrical dielectric lens members varies along their direction of extension. By that, a desired varying level of the local minimum between and with regard to the two maxima of the radar radiation pattern can be accomplished. For instance, in a suitable design a solution for balancing a radar power simultaneously transmitted to a middle position and outer positions with regard to a radar device can be provided for a vehicle having two rear seat benches arranged in a row.

Preferably, at least one out of a first width of the first plano-convex cylindrical dielectric lens member and a second width of the second plano-convex cylindrical dielectric lens member is at least twice as large as the respective height of the plano-convex cylindrical dielectric lens member, wherein the widths are measured in a direction parallel to the surface of the plane-parallel dielectric substrate and perpendicular to the direction of extension of the respective plano-convex cylindrical dielectric lens member. In this way, a flat design of the dielectric lens device can be accomplished.

In preferred embodiments of the dielectric lens device, the plano-convex cylindrical dielectric lens members and the plane-parallel dielectric substrate are for the most part made from a thermoplastic polymer and are formed as a single unitary piece. In this way, high-precision mass production processes such as injection molding, compression molding or extrusion molding can be applied for integrally producing the dielectric lens device, which can result in low tolerance margins and high reproducibility regarding its radar refraction properties.

For the purposes of the present invention, the term "for the most part" shall be understood as meaning in particular a proportion of more than 50% by volume, preferably more than 70% by volume and, with particular preference, more than 90% by volume. In particular, the term is intended to include the possibility that the plano-convex cylindrical dielectric lens members and the plane-parallel dielectric substrate are completely, i.e. to 100% by volume, made of the thermoplastic material.

In another aspect of the invention, a radar device for automotive interior radar sensing applications is provided that comprises a dielectric lens device as disclosed in this application, and at least one radar antenna member. The at least one radar antenna member is arranged in a spaced manner to face a surface of the plane-parallel dielectric substrate opposite of the two plano-convex cylindrical dielectric lens members. The at least one radar antenna member is arranged such that a direction of its strongest power emission runs perpendicular to the surface of the plane-parallel dielectric substrate.

The benefits described in context with the disclosed dielectric lens device apply to the proposed radar device for automotive radar sensing applications to the full extent.

In preferred embodiments of the radar device, the at least one radar antenna member is arranged on a center line of the dielectric lens device that is arranged perpendicular to the surface of the plane-parallel dielectric substrate and that is equally spaced to the two plano-convex cylindrical dielectric lens members.

This is particularly beneficial for an integration of the radar device in the middle section of a vehicle ceiling, which is the preferred location for vehicle interior sensing applications such as passenger detection and/or vital-sign monitoring.

Preferably, a size of a spacing between the two plano-convex cylindrical dielectric lens members on the plane-parallel dielectric substrate and sizes of their heights are selected such that a ratio of radar power magnitude of a local minimum that is located between two maxima of a radar power magnitude in a transmitted radiation pattern to one of the maxima of radar power magnitude in the transmitted radiation pattern lies between 2.0 and 4.0. In this way, for a wide range of potential geometries of passenger car interiors, particularly rear seat benches, a radar power level transmitted to a middle position of a vehicle rear bench and outer positions of the rear bench can be balanced, and a position-independent radar sensor functionality can be achieved.

In preferred embodiments of the radar device, the at least one radar antenna member has a Gaussian-type main lobe, and the dielectric lens device is configured for being arranged behind a vehicle headliner as an operating location. Maxima and minima in the radar radiation pattern, such as oscillations of radar power that are potentially caused by the headliner can be mitigated or even eliminated by a suitably designed dielectric lens device of the radar device.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies embodiments of the invention in particular in connection with the figures.

BRIEF DESCRIPTION OF THE DRAWINGS

Further details and advantages of the present invention will be apparent from the following detailed description of not limiting embodiments with reference to the attached drawing, wherein.

DETAILED DESCRIPTION

Figure 1:
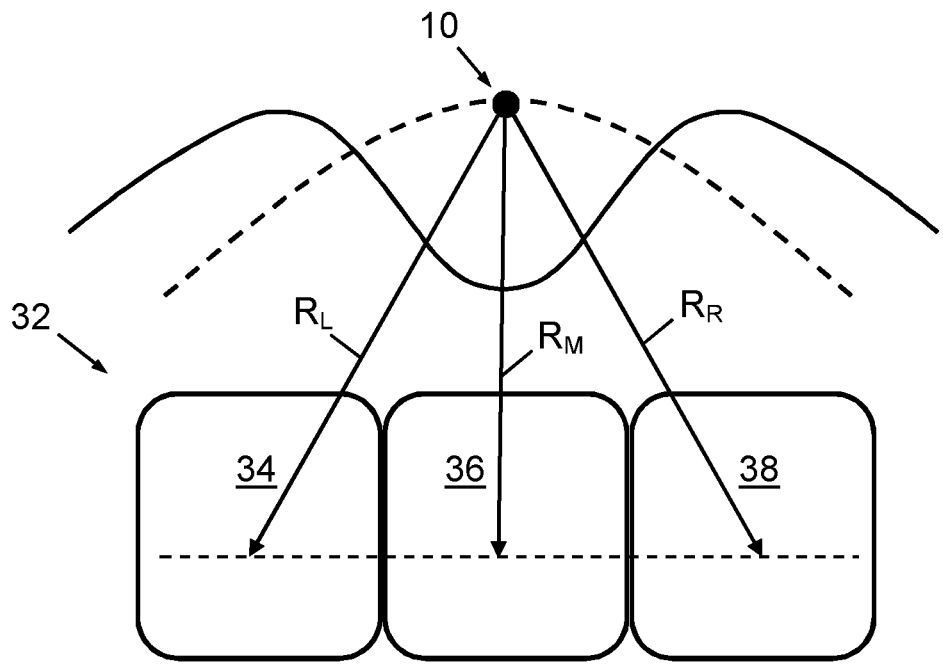
FIG. 1 schematically illustrates a configuration of a radar device in accordance with an embodiment of the invention employed for interior automotive radar sensing of a vehicle rear seat bench.

FIG. 1 schematically illustrates a configuration of a radar device 10 in accordance with an embodiment of the invention employed for interior automotive radar sensing at a vehicle rear seat bench 32. The vehicle is designed as a sedan passenger car (not shown). The radar device 10 may be configured for vital-sign monitoring, for instance by monitoring a heart rate and/or a respiratory movement of vehicle passengers, or for occupant classification. The phrases "configured to" and "configured for", as used in this application, shall in particular be understood as being specifically programmed, laid out, furnished or arranged.

The rear seat bench 32 comprises three regular occupiable seating positions: a left seating position 34, a middle seating position 36 and a right seating position 38. In this specific embodiment, the radar device 10 is integrated in a car ceiling in a middle position. Thus, a distance $R_L$ between the radar device 10 and the left seating position 34 and a distance $R_R$ between the radar device 10 and or the right seat position 38, respectively, is larger than a distance $R_M$ between the radar device 10 and the middle seating position 36 by 20% to 40%, depending on the exact geometry of the passenger car interior.

Figure 2:
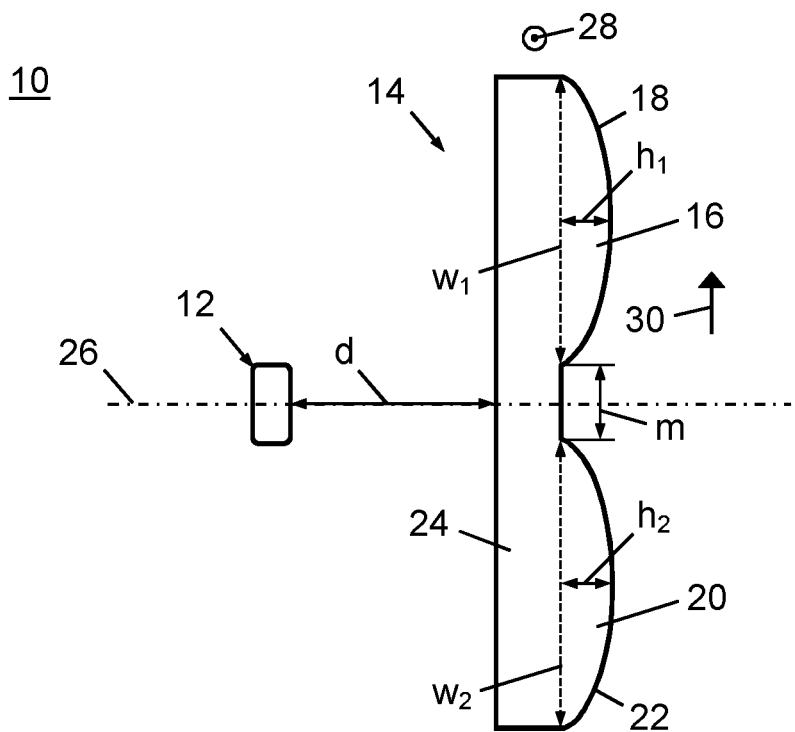
FIG. 2 illustrates a schematic cross-sectional view of a dielectric lens device of the radar device pursuant to FIG. 1.

FIG. 2 shows a schematic cross-sectional view of a dielectric lens device 14 of the radar device 10 pursuant to FIG. 1. The dielectric lens device 14 comprises a first plano-convex cylindrical dielectric lens member 16 and a second plano-convex cylindrical dielectric lens member 20. A cross-sectional area of the dielectric lens members 16, 20 is unchanged along a direction of extension 28 of the dielectric lens members 16, 20, which is arranged perpendicular to the drawing plane of FIG. 2. The first plano-convex cylindrical dielectric lens member 16 and the second plano-convex cylindrical dielectric lens member 20, i.e. their respective directions of extension 28, are arranged in parallel. The first plano-convex cylindrical dielectric lens member 16 and the second plano-convex cylindrical dielectric lens member 20 may be completely made from a low-loss (low dielectric loss tangent) thermoplastic polymer, such as polyethylene (PE) or polypropylene (PP). Any other thermoplastic polymer material that appears suitable to those skilled in the art may also be used.

The dielectric lens device 14 further comprises a plane-parallel dielectric substrate 24. The plane-parallel dielectric substrate 24 is completely made from the same thermoplastic polymer material as the two plano-convex cylindrical dielectric lens members 16, 20. The two plano-convex cylindrical dielectric lens members 16, 20 are arranged with their plane surfaces towards a same surface of the plane-parallel dielectric substrate 24. The plano-convex cylindrical dielectric lens members 16, 20 are interconnected to the plane-parallel dielectric substrate 24 in a material fit. The material fit may be established by integrally forming the plano-convex cylindrical dielectric lens members 16, 20 and the plane-parallel dielectric substrate 24 as a single unitary piece using, for instance, an injection molding, a compression molding or an extrusion molding process. In other embodiments, the plano-convex cylindrical dielectric lens members 16, 20 and the plane-parallel dielectric substrate 24 may be produced in separate production processes, and the material fit may for example be established by applying an adhesive or by applying a friction welding process.

The first plano-convex cylindrical dielectric lens member 16 and the second plano-convex cylindrical dielectric lens member 20 are arranged in a spaced manner, separated by a spacing of size m, which is measured in a direction 30 parallel to the surface of the plane-parallel dielectric substrate 24 and perpendicular to the direction of extension 28.

For the case of symmetric antenna radiation pattern, and symmetric sensor integration, the convex surface 18 of the first plano-convex cylindrical dielectric lens member 16 and the convex surface 22 of the second plano-convex cylindrical dielectric lens member 20 are identically shaped. Both convex surfaces 18, 22 are shaped as portions of an elliptical cylinder surface. In other potential embodiments, the convex surfaces 18, 22 may be shaped as portions of a parabolic cylinder surface. For an asymmetric antenna radiation pattern or in cases, in which the sensor is integrated asymmetrically, one dielectric lens member can have a larger height in order to compensate for.

In this specific embodiment, a first height $h_1$ of the first plano-convex cylindrical dielectric lens member 16 and a second height $h_2$ of the second plano-convex cylindrical dielectric lens member 20, measured in a direction that is perpendicular to the surface of the plane-parallel dielectric substrate 24, are equal. In other embodiments, the first height of the first plano-convex cylindrical dielectric lens member and the second height of the second plano-convex cylindrical dielectric lens member may differ from each other.

The radar device 10 further comprises a radar antenna member 12 that is designed as a radar transceiver antenna and forms part of a radar transmitting/receiving unit (not shown) as is known in the art. For instance, the radar transmitting/receiving unit may in turn form part of a frequency-modulated continuous-wave (FMCW) radar system.

The radar antenna member 12 is arranged in a spaced manner to face a surface of the plane-parallel dielectric substrate 24 opposite of the two plano-convex cylindrical dielectric lens members 16, 20. A direction of its strongest power emission runs perpendicular to the surface of the plane-parallel dielectric substrate 24. The radar antenna member 12 is disposed on a center line 26 of the dielectric lens device 14. The center line 26 is arranged perpendicular to the surface of the plane-parallel dielectric substrate 24 and can be thought of as an intersecting line of a symmetry plane with the drawing plane. The center line 26 is equally spaced to the two plano-convex cylindrical dielectric lens members 16, 20.

A distance d between the radar antenna member 12 and the dielectric lens device 14 is selected such that destructive interference will occur in the middle of the radiation pattern between radar waves transmitted from the convex surface 18 of the first plano-convex cylindrical dielectric lens member 16 and the convex surface 22 of the second plano-convex cylindrical dielectric lens member 20, respectively.

Figure 3:
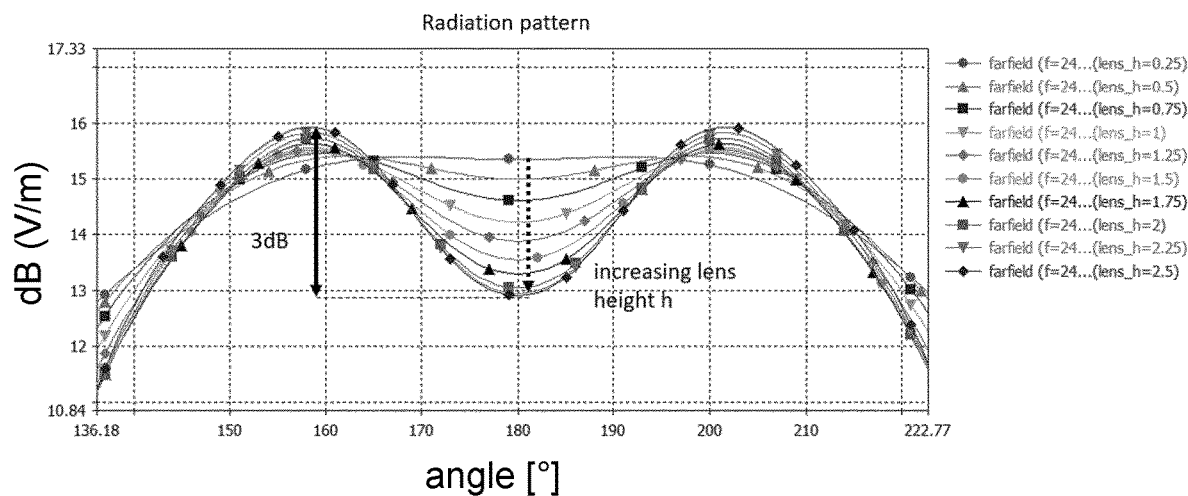
FIG. 3 illustrates a graph of calculated electrical field radar radiation patterns of the radar device pursuant to FIG. 2 for various heights of plano-convex cylindrical dielectric lens members of the dielectric lens device and a spacing size m of zero.

FIG. 3 shows a graph of calculated electrical field radar radiation patterns (i.e. the angular characteristic of the antenna directivity) generated by a radar device similar to the radar device 10 pursuant to FIG. 2 for various heights of plano-convex cylindrical dielectric lens members of the dielectric lens device on a logarithmic scale. The radar antenna member 12 has a Gaussian-shaped radar radiation pattern with a 3 dB beam width of 80°. The electric field is calculated at a distance of 1 m from the radar antenna member 12. For these calculations, the size m of the spacing between the plano-convex cylindrical dielectric lens members has been set to zero. With increasing heights of the plano-convex cylindrical dielectric lens members, a local minimum of radiated radar power located between two maxima of radiated radar power develops and becomes more and more pronounced in the transmitted radar radiation pattern. The electrical field radar radiation pattern of the mere radar antenna member 12 of the radar device 10 (dashed line), i.e. without employing the dielectric lens device 14, and the electrical field radar radiation pattern of the radar device 10 are schematically indicated also in FIG. 1.

Figure 4:
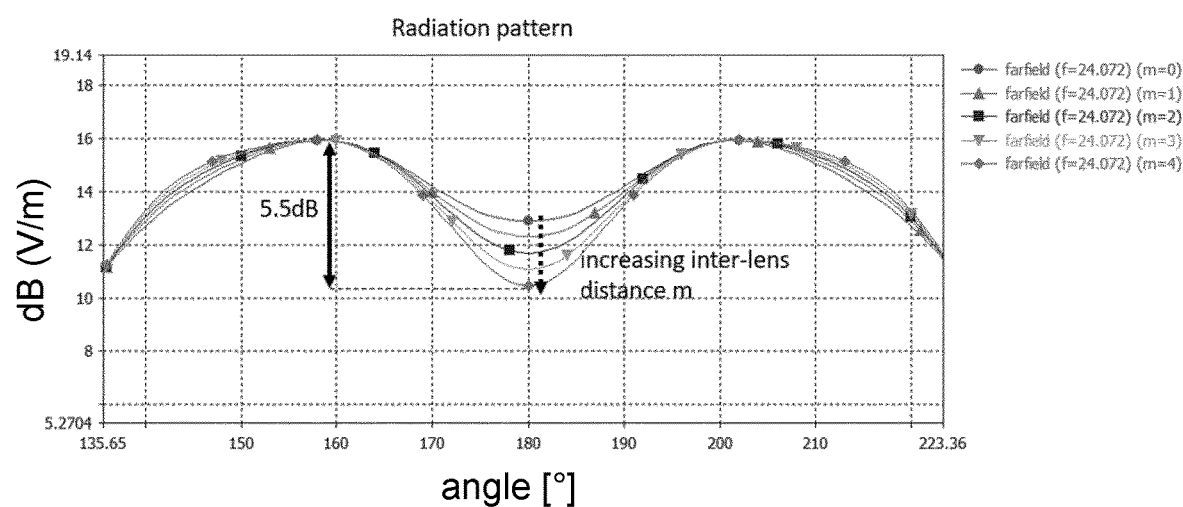
FIG. 4 illustrates a graph of calculated electrical field radar radiation patterns of the radar device pursuant to FIG. 2 for various spacing size m of the plano-convex cylindrical dielectric lens members of the dielectric lens device and fixed heights ($h_1=h_2=h$) of plano-convex cylindrical dielectric lens members.

FIG. 4 is a graph of calculated electrical field radar radiation patterns generated by a radar device similar to the radar device 10 pursuant to FIG. 2 for various sizes m of the spacing between the plano-convex cylindrical dielectric lens members 16, 20 of the dielectric lens device on a logarithmic scale. Again, the radar antenna member 12 has a Gaussian-shaped radar radiation pattern with a 3 dB beam width of 80°, and the electric field is calculated at a distance of 1 m from the radar antenna member 12. The heights $h_1$, $h_2$ of the plano-convex cylindrical dielectric lens members 16, 20 are kept equal and constant. With increasing size m of the spacing between the plano-convex cylindrical dielectric lens members 16, 20, a local minimum of radiated radar power located between two maxima of radiated radar power develops and becomes more and more pronounced in the transmitted radar radiation pattern.

The radar power received at the various seating positions 34, 36, 38 scales inversely with the $4^{th}$ power of the respective distance $R_L$, $R_M$, $R_R$. With the distance $R_L$, $R_R$ between the radar device 10 and the left seating position 34 or the right seating position 38, respectively, being 1.2 to 1.4 times larger than the distance $R_M$ between the radar device 10 and the middle seating position 36, balancing a radar power transmitted to the middle seating position 36 and the left seating position 34 and the right seat position 38, respectively, would require transmitting two to four times as much radar power in a direction towards the left seating position 34 and the right seating position 38, respectively, than in a direction towards the middle seating position 36. This corresponds to a ratio between radar power of the local minimum located between the two maxima of radar power in the transmitted radiation pattern to one of the maxima of radar power in the transmitted radiation pattern between 3 dB and 6 dB, which can be fulfilled by selecting appropriate values for a size m of the spacing between the two plano-convex cylindrical dielectric lens members 16, 20 on the plane-parallel dielectric substrate 24 and/or values for sizes of their heights $h_1$, $h_2$, as can readily be obtained from the graphs shown in FIGS. 3 and 4.

Figure 5:
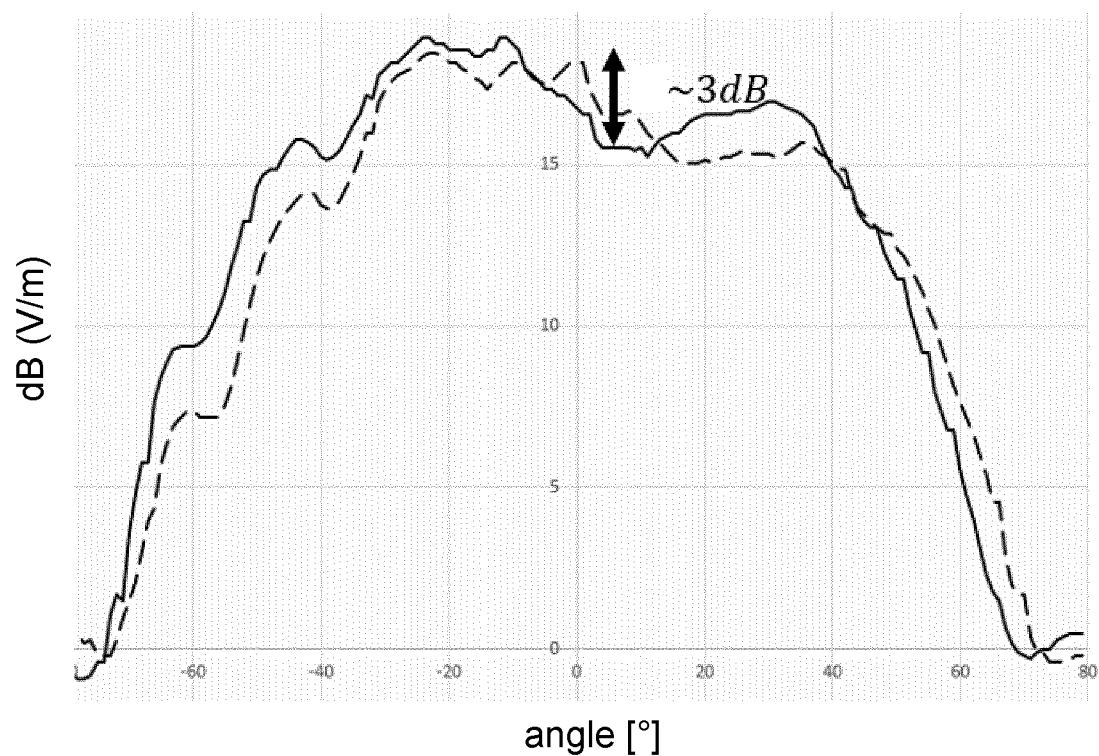
FIG. 5 illustrates a graph of experimental results for an electrical field radar radiation pattern of a radar device in accordance with the invention, in comparison to an electrical field radar radiation pattern of the sole radar antenna member of the radar device.

FIG. 5 shows a graph of experimental results for an electrical field radar radiation pattern of a radar device 10 on a logarithmic scale (solid line), compared to an electrical field radar radiation pattern of the mere radar antenna member 12 of the radar device 10 (dashed line), i.e. without employing the dielectric lens device 14, demonstrating an experimental verification of the desired beam shaping effect of the dielectric lens device 14.

Figure 6:
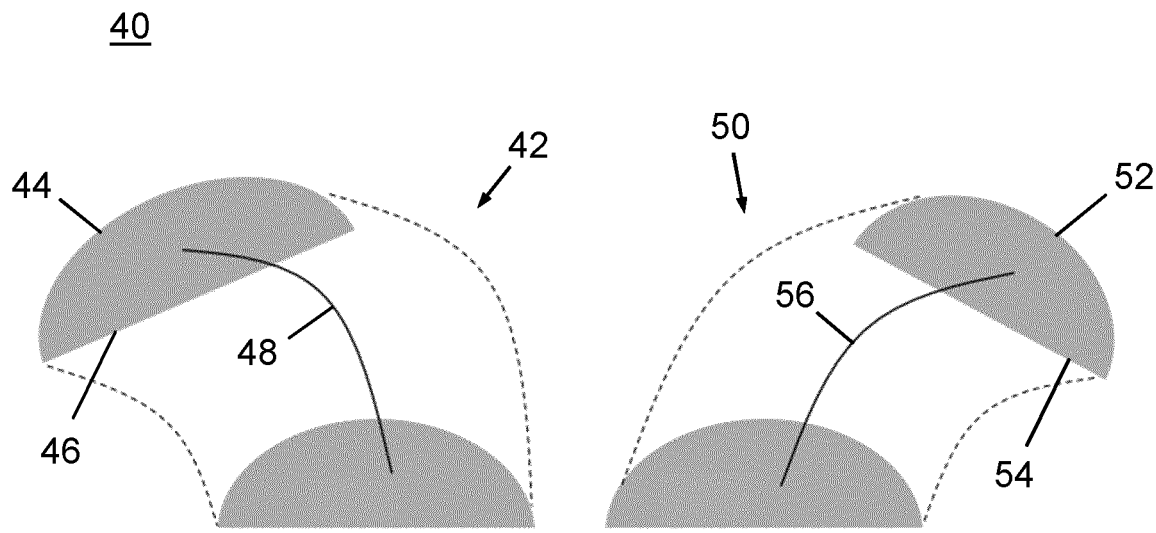
FIG. 6 illustrates a schematic perspective view of an alternative embodiment of a dielectric lens device of the radar device pursuant to FIG. 1.

FIG. 6 illustrates a schematic perspective view of an alternative embodiment of a dielectric lens device 40 of the radar device 10 pursuant to FIG. 1. A plane-parallel dielectric substrate of the dielectric lens device 40 is omitted for clarity reasons. The dielectric lens device 40 comprises a first plano-convex cylindrical dielectric lens member 42 and a second plano-convex cylindrical dielectric lens member 52. The first plano-convex cylindrical dielectric lens member 42 has a convex surface 44 and an oppositely arranged developable surface 46. The second plano-convex cylindrical dielectric lens member 52 has a convex surface 54 and an oppositely arranged developable surface 56. A cross-sectional area 50, 60 of the dielectric lens members 42, 52 is unchanged along individual directions of extension 48, 58 of the dielectric lens members 42, 52, which are curved lines in the three-dimensional space. The plane-parallel dielectric substrate (not shown) is twisted and warped such that the individual directions of extension 48, 58 run parallel to its surface.

The first plano-convex cylindrical dielectric lens member 42 and the second plano-convex cylindrical dielectric lens member 52 may be completely made from a low-loss (low dielectric loss tangent) thermoplastic polymer, such as polyethylene (PE) or polypropylene (PP). Any other thermoplastic polymer material that appears suitable to those skilled in the art may also be used. Each of the first plano-convex cylindrical dielectric lens member 42 and the second plano-convex cylindrical dielectric lens member 52 may be manufactured using an extrusion molding process, wherein the extrusion is carried out along the individual directions of extension 48, 58. In this way, a radar radiation pattern in a plane arranged perpendicular to a rear seat bench can be modified as well. This embodiment of the dielectric lens device 40 can beneficially be used in particular in radar devices employed to observe multiple-row seats in a car or a bus.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. A radar device for interior automotive radar sensing applications, comprising:
   a dielectric lens device for shaping a radar beam, comprising:
      a first plano-convex cylindrical dielectric lens member and a second plano-convex cylindrical dielectric lens member,
      a plane-parallel dielectric substrate,
   wherein
      the two plano-convex cylindrical dielectric lens members are arranged with their plane surfaces towards a same surface of the plane-parallel dielectric substrate, and
      the plano-convex cylindrical dielectric lens members are interconnected to the plane-parallel dielectric substrate in a material fit, and
   at least one radar antenna member,
   wherein
      the at least one radar antenna member is arranged in a spaced manner to face a surface of the plane-parallel dielectric substrate opposite of the two plano-convex cylindrical dielectric lens members, and
      the at least one radar antenna member is arranged such that a direction of its strongest power emission runs perpendicular to the surface of the plane-parallel dielectric substrate.

2. The radar device as claimed in claim 1, wherein a first height of the first plano-convex cylindrical dielectric lens member and a second height of the second plano-convex cylindrical dielectric lens member, measured in a direction that is perpendicular to the surface of the plane-parallel dielectric substrate, are substantially equal.

3. The radar device as claimed in claim 1, wherein the first and the second plano-convex cylindrical dielectric lens member are arranged in a spaced manner.

4. The radar device as claimed in claim 1, wherein at least one out of the convex surface of the first plano-convex cylindrical dielectric lens member and the convex surface of the second plano-convex cylindrical dielectric lens member is shaped as a portion of an elliptical cylinder surface.

5. The radar device as claimed in claim 1, wherein at least one of the convex surface of the first plano-convex cylindrical dielectric lens member and the convex surface of the second plano-convex cylindrical dielectric lens member is shaped as a portion of a parabolic cylinder surface.

6. The radar device as claimed in claim 1, wherein at least one of the convex surface of the first plano-convex cylindrical dielectric lens member and the convex surface of the second plano-convex cylindrical dielectric lens member is shaped as a portion of a cylinder having a direction of extension that is curved.

7. The radar device as claimed in claim 1, wherein at least one out of a first width of the first plano-convex cylindrical dielectric lens member and a second width of the second plano-convex cylindrical dielectric lens member is at least twice as large as the respective height of the plano-convex cylindrical dielectric lens member, wherein the widths are measured in a direction parallel to the surface of the plane-parallel dielectric substrate and perpendicular to a direction of extension of the respective plano-convex cylindrical dielectric lens member.

8. The radar device as claimed in claim 1, wherein the plano-convex cylindrical dielectric lens member and the plane-parallel dielectric substrate are for the most part made from a thermoplastic polymer and are formed as a single unitary piece.

9. The radar device as claimed in claim 1, wherein the at least one radar antenna member is arranged on a center line of the dielectric lens device that is arranged perpendicular to the surface of the plane-parallel dielectric substrate and that is equally spaced to the two plano-convex cylindrical dielectric lens members.

10. The radar device as claimed in claim 1, wherein a size of a spacing between the two plano-convex cylindrical dielectric lens members on the plane-parallel dielectric substrate and sizes of their heights are selected such that a ratio of a radar power magnitude of a local minimum that is located between two maxima of a radar power magnitude in a transmitted radiation pattern to one of the maxima of radar power magnitude in the transmitted radiation pattern lies between 2.0 and 4.0.

11. The radar device as claimed in claim 1, wherein the at least one radar antenna member has a Gaussian-type main lobe, and wherein the dielectric lens device is configured for being arranged behind a vehicle headliner as an operating location.

* * * * *